Figure 1:
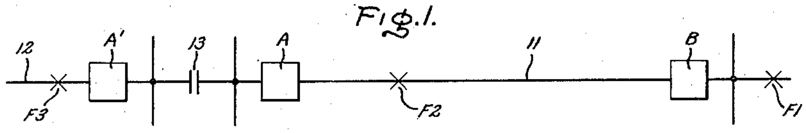

May 13, 1958 A. J. McCONNELL 2,834,921

PHASE COMPARISON PROTECTIVE RELAYING SYSTEM

Filed Nov. 14, 1955 2 Sheets-Sheet 1

Inventor:
Andrew J. McConnell,
by J. Wesley Haubner
His Attorney.

PHASE COMPARISON PROTECTIVE RELAYING SYSTEM

Filed Nov. 14, 1955 2 Sheets-Sheet 2

Inventor:
Andrew J. McConnell,
by J Wesley Haubner
His Attorney.

2,834,921

PHASE COMPARISON PROTECTIVE RELAYING SYSTEM

Andrew J. McConnell, Delmar, N. Y., assignor to General Electric Company, a corporation of New York Application November 14, 1955, Serial No. 546,575

6 Claims. (Cl. 317—28)

This invention relates to phase comparison protective relaying systems, and more particularly to a phase comparison relaying system for protecting an alternating current electric power transmission line wherein the magnitude of line current during short circuit or fault conditions may be less than during normal load conditions.

In a typical relaying system of the phase comparison type for protecting an electric power transmission line, suitable networks are used to derive a single phase alternating voltage from the line currents at each end or terminal of the protected line. During negative half cycles, the derived voltage at each terminal supplies an operating voltage to a local comparing circuit, while during positive half cycles it causes an oscillating signal to be transmitted over a suitable pilot channel to the opposite terminal. A receiver at each terminal responds to receipt of the oscillating signal by producing a restraining voltage for the associated comparing circuit. When energized by operating voltage in the absence of restraining voltage, each comparing circuit effects a predetermined control operation at its respective terminal, such as tripping a circuit interrupter. The relative polarities of the two derived voltages at the two terminals are such that during a fault which is external to the protected line, the derived voltages are out-of-phase and the oscillating signals are transmitted alternately, whereby restraining voltage is produced at the same time operating voltage is supplied to each comparing circuit, and no control operation is effected at either terminal. However, during a fault on the protected line, the phase of one of the derived voltages reverses by approximately 180 electrical degrees so that oscillating signals will now be transmitted simultaneously from both terminals, and the operating voltages are unrestrained thereby effecting control operations at both terminals.

To insure correct operation of a phase comparison relaying system such as described above, an oscillating signal must be transmitted from one terminal before control operation is permitted at the other terminal and at a more sensitive level than required for control operation at the other terminal. This procedure is necessary to avoid incorrect operation which might otherwise occur during external fault conditions if operating voltage were supplied to a comparing circuit either before restraining voltage could be produced, or in the absence of a restraining voltage. Hitherto it has been common to provide low-set and slightly slower operating high-set current responsive devices at each terminal. The low-set device is connected to permit oscillating signal transmission when the transmission line current exceeds a first predetermined magnitude, while the high-set device is connected to block the control operation of the associated comparing circuit until a second, higher predetermined magnitude of current exists. Thus, during an external fault, if the fault current level is sufficient to permit the control operation of the comparing circuit at one line terminal, not only is it assured that the restraining voltage from the opposite line terminal will be present, but also that it will be present in advance of the local operating voltage. Such a system is satisfactory for applications wherein the magnitude of fault current exceeds the magnitude of normal load current. However, in the not uncommon situation wherein fault current magnitude may be less than load current, as where the rotating machinery comprising the load connected to one terminal has a relatively low current generating capacity with respect to the source of power connected to the other terminal, such a system would require the continuous transmission of oscillating signals. Since it is frequently desirable to use the pilot channel for purposes other than protective relaying, the continuous peremptory control over the pilot channel by the phase comparison relaying system is highly unsatisfactory.

Accordingly, it is an object of this invention to provide an improved phase comparison protective relaying system which responds only to fault conditions even if the magnitude of fault current is considerably below the magnitude of the normal load current.

It is another object to provide a phase comparison protective relaying system employing distance type relays in a manner to supervise the operation of the relaying system whereby correct response to faults of less than load current is obtained without utilizing continuous transmission of oscillating signals.

In carrying out my invention in one form I provide a fault responsive starting relay and a fault responsive supervising relay at each terminal of a protected transmission line. Both starting and supervising relays are conventional distance type relays having circular impedance operating characteristics. The supervising relay operates in response to any fault on the protected line, while the starting relay at one terminal operates in response to any fault condition which causes operation of the supervising relay located at the opposite terminal. The starting relay is arranged to operate in advance of supervising relay operation. A network is provided at each terminal for deriving a single phase alternating voltage from the line currents at the associated terminals, and the local starting relay is used to suppress this voltage until said starting relay operates. The voltages derived at opposite terminals are out-of-phase with respect to each other as long as line current is flowing in one terminal and out the other. A transmitter is provided at each terminal for transmitting an oscillating signal during positive half cycles of the derived voltage, and a receiver is located at each terminal for producing a restraining voltage whenever an oscillating signal is received from the opposite terminal. I provide a comparing circuit at each terminal coupled to the associated network and receiver. Negative half cycles of the derived voltage comprise operating voltage for the comparing circuit, and this circuit will produce an output voltage whenever it is energized by control voltage in the absence of restraining voltage. The associated supervising relay is connected to block the output voltage until said supervising relay operates. When unblocked, the output voltage is available to perform desired control operations, such as initiating tripping operation of a circuit interrupter.

In another form of my invention, I provide a system similar to that described above except that the supervising relays are arranged to respond only to faults on the protected transmission line and beyond the opposite terminal. The starting relay at each terminal is arranged to operate in response to those fault conditions external to the protected line to which the supervising relay at the opposite terminal will respond. In this form of my invention, the supervising relay is also connected to suppress the derived voltage until said supervising relay operates, and thus correct operation is obtained for faults on the protected line.

Figures 2, 3:
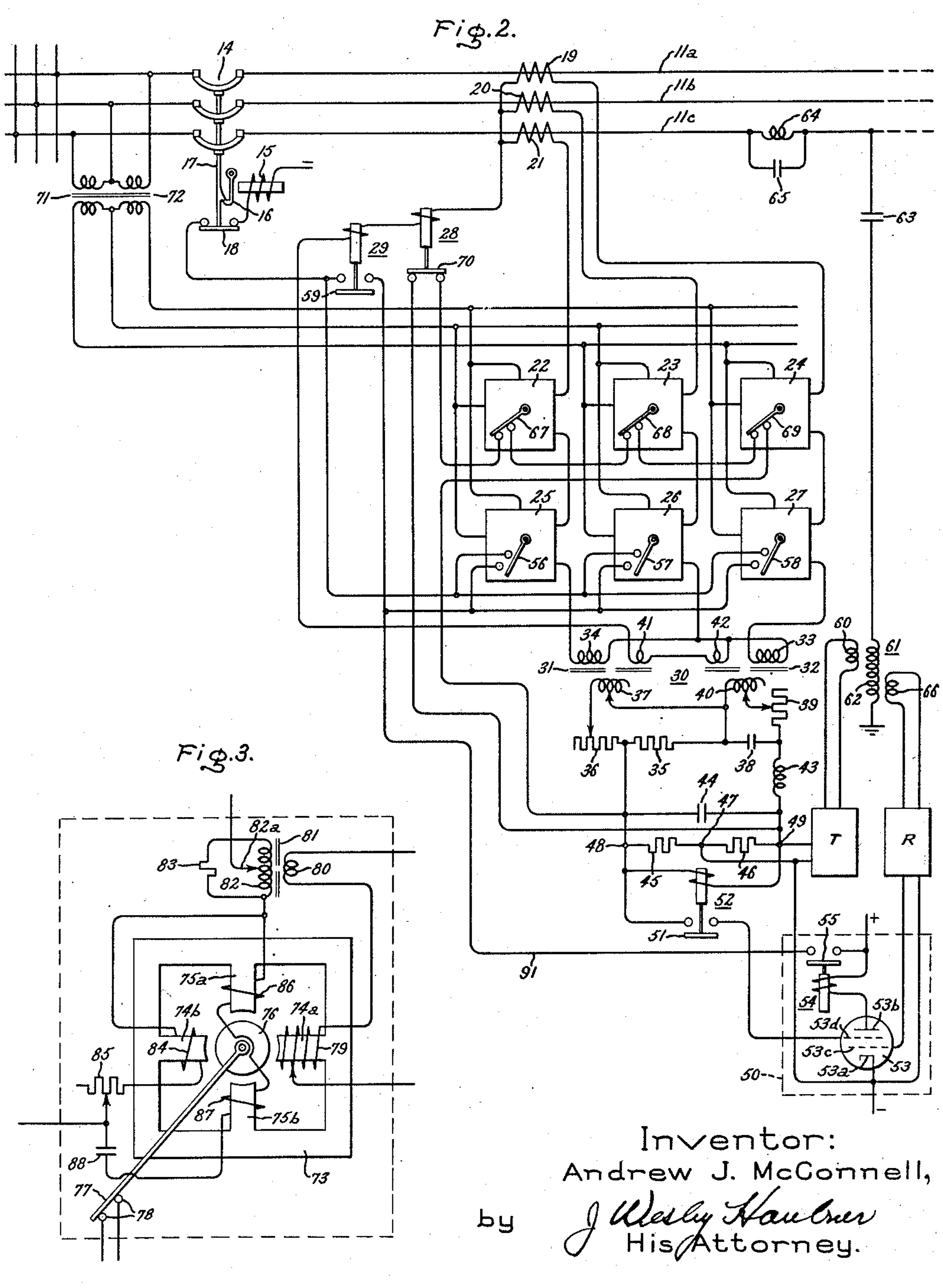
Figure 4:
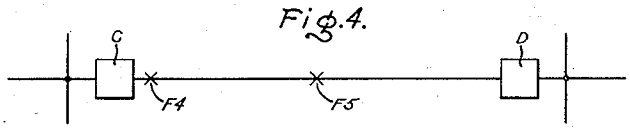
Figure 5:
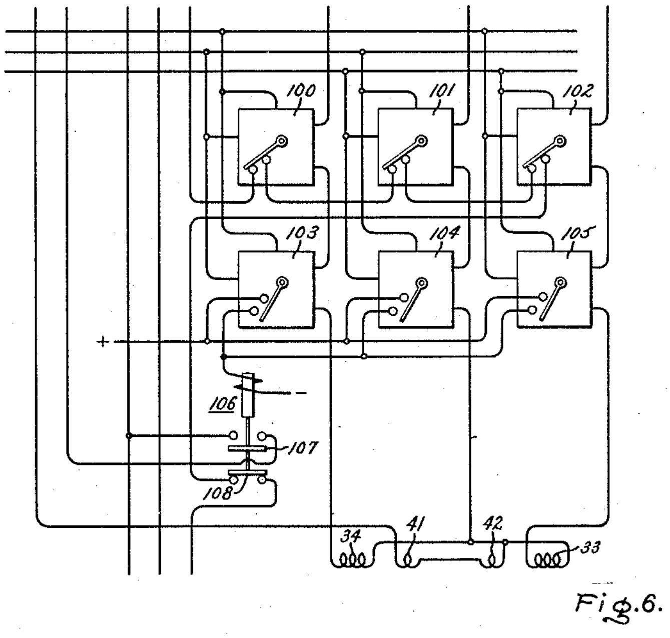
Figure 6:
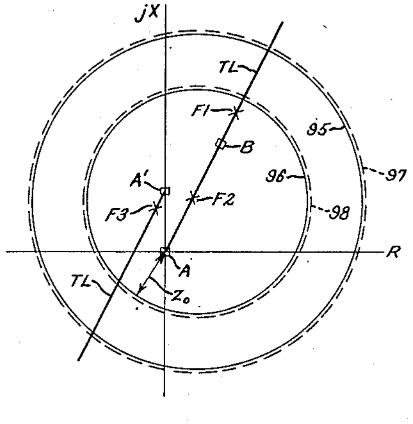
Figure 7:
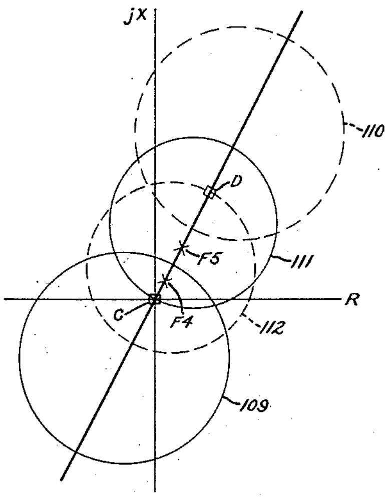

My invention will be better understood and further objects and advantages will be apparent from the following description taken in conjunction with the accompanying drawings in which Fig. 1 is a single line diagram of an electric power transmission system in which my phase comparison relaying system may be employed; Fig. 2 is a schematic representation of a preferred embodiment of my system at one terminal of the electric power system shown in Fig. 1; Fig. 3 is a schematic diagram of a typical distance type relay used in accordance with my invention; Fig. 4 is a single line diagram of another electric power transmission system in which my relaying system may be employed; Fig. 5 is a schematic representation of the modifications of the circuits shown in Fig. 2 for use in connection with the electric power system of Fig. 4; and Figs. 6 and 7 are graphical representations of the operating characteristics of the distance type relays shown in Figs. 2 and 5 respectively.

As shown in the single line diagram of Fig. 1, a section 11 of an electric power transmission line extends between opposite ends or terminals A and B. The transmission line section 11 may be of the type employed in an electric power circuit to transmit 3-phase alternating current of power frequency, such as 60 cycles per second, from one terminal to the other at very high voltage, e. g., 130,000 volts phase-to-phase. Identical protective relaying equipment is provided at each terminal to quickly perform simultaneous control operations, such as opening circuit interrupters and thereby isolating the transmission line section, upon the occurrence of an internal fault, i. e., upon the occurrence of a short circuit between phase conductors (phase fault) or between a conductor and ground (ground fault) at some point along line 11 between the opposite terminals A and B. Although I have illustrated only a two terminal transmission line, my invention is also adaptable to transmission lines having three or more terminals.

To increase the amount of load current that can be transmitted over line 11, a capacitor may be connected in series therewith. Assuming that a source of electric energy is connected to the section of the electric power circuit designated by the reference character 12, and that load current is normally transmitted over the protected line 11 from terminal A to terminal B, a series capacitor 13 may be located as shown in Fig. 1 between the terminal A' of section 12 and terminal A.

Fig. 2 illustrates the equipment at terminal A. The phase conductors comprising the protected transmission line 11 are designated 11*a*, 11*b* and 11*c*. A 3-pole circuit interrupter 14 shown in its circuit making position and having an electroresponsive trip coil 15 is provided. Energization of trip coil 15 magnetically attracts pivotally mounted latch 16 which releases movable switch member 17 for rapid circuit interrupting action. Upon opening of circuit interrupter 14, an auxiliary switch 18 operates to deenergize trip coil 15.

Three current transformers 19, 20 and 21 are coupled to conductors 11*a*, 11*b* and 11*c*, respectively, at terminal A. As can be seen in Fig. 2, the Y-connected secondary circuits of these transformers supply phase fault responsive starting relays 22, 23 and 24, phase fault responsive supervising relays 25, 26 and 27, and ground fault responsive starting and supervising relays 28 and 29 respectively. The current transformer secondary circuits also supply a phase sequence network 30 which will now be described.

Network 30 is used to derive a single phase alternating voltage from currents flowing in the three line conductors 11*a*, 11*b* and 11*c*. Although any suitable network may be used, I have illustrated a particular network such as that described and claimed in my Patent No. 2,456,976, issued on December 21, 1948. As shown in Fig. 2, this network comprises a pair of transforming means 31 and 32, each of which is of the type known in the art as a transactor. Each transactor 31 and 32 comprises a pair of primary windings, a secondary winding and an iron core with an air gap, and a voltage is developed across the secondary winding which represents the net primary current in magnitude. The magnitude of secondary voltage and the phase angle by which it leads the net primary current is determined by the load in the secondary circuit. Open circuit secondary voltage leads the net primary current by 90 electrical degrees.

The secondary circuit of current transformer 19 is connected in series with a primary winding 33 of transactor 32 so that this transactor is energized by the current in line conductor 11*a*, and the secondary circuit of current transformer 21 is connected in series with a primary winding 34 of transactor 31 so that this transactor is energized by the current in line conductor 11*c*. A fixed resistor 35 and an adjustable resistor 36 are connected in series across the secondary winding 37 of the transactor 31, and a capacitor 38 and an adjustable resistor 39 are connected in series circuit across the secondary winding 40 of transactor 32. The capacitor 38 and the resistor 39 are arranged so that the voltage drop across capacitor 38 lags the secondary voltage of transactor 32 by 60 electrical degrees. The effective secondary turns of transactor 32 are such that for the same magnitude of primary current in the primary windings 33 and 34, the voltage across capacitor 38 is slightly less than the secondary voltage of transactor 31. The resistor 36 is adjusted so that the voltage across resistor 35 under such current conditions in the primary windings 33 and 34 is less than the voltage across capacitor 38.

Network 30 is provided with means for biasing it with zero phase sequence current. Transactors 31 and 32 have second primary windings 41 and 42 respectively. Windings 41 and 42 are connected in series circuit relationship, and the combination is connected to the secondary circuits of the current transformers 19, 20 and 21 in such a manner as to be energized by the residual current flowing from the secondary circuits. The effective turns of primary winding 41 are different than the effective turns of primary winding 42, and the effective turns of both primary windings 41 and 42 are equal to one-third of the effective turns of each of the primary windings 33 and 34. Thus, zero phase sequence voltage is induced in the secondary windings of the transactors 31 and 32.

The secondary circuits of the transactors 31 and 32 are so interconnected that with balanced 3-phase currents in the transmission line, alternating voltage is developed across resistor 35 and capacitor 38 which voltage is proportional to a combination of the negative phase sequence and the positive phase sequence currents in transmission line 11 at the point where current transformers 19, 20 and 21 are connected. This voltage is obtained under all fault conditions. A low-pass filter comprising inductance 43 and capacitor 44 is connected across the resistor 35 and capacitor 38 to eliminate harmonics in the output voltage of network 30. This low-pass filter has a low value of impedance at fundamental frequencies but attenuates harmonic frequencies.

As shown in Fig. 2, a pair of voltage dividing resistors 45 and 46 are connected in series across capacitor 44, and the voltage appearing across this voltage dividing combination comprises the voltage derived by network 30. This derived voltage has a predetermined phase relationship with respect to the transmission line current at terminal A. The common point 47 between resistors 45 and 46 is connected to a negative bus — of a unidirectional supply voltage source, such as a battery, which has not been shown. The outer terminals of resistors 45 and 46 are designated points 48 and 49 respectively.

The portion of the derived voltage appearing across resistor 45 is supplied to a comparing circuit 50. Contact 51 of an electromagnetic level detecting relay 52 must be closed before comparer 50 can be energized by this voltage. The level detecting relay 52, which has been connected across the voltage dividing resistors 45 and 46 for reasons to be explained hereinafter, will close its contact 51 only when energized by more than a predetermined minimum value of derived voltage.

As shown in Fig. 2, the comparing circuit 50 comprises essentially a pentode vacuum tube or electric valve 53 having a cathode 53*a*, a plate 53*b*, a control grid 53*c*, and a screen grid 53*d*. Plate 53*b* is connected through the operating coil of an electromagnetic control relay 54 to a positive bus + of the unidirectional supply voltage source. Cathode 53a is connected directly to the negative bus —. Point 48 of resistor 45 is connected through contact 51 to screen grid 53*d*. Whenever contact 51 is closed and the derived voltage is positive at 48 with respect to 47, screen grid 53*d* is positive with respect to cathode 53*a*, and tube 53 is operable, that is, electron discharge from cathode 53*a* to plate 53*b* is encouraged. Each half cycle of derived voltage which renders tube 53 conductive is designated operating voltage. Thus, operating voltage is supplied to comparing circuit 50 during the alternate half cycles of derived voltage when point 48 is positive with respect to point 47.

Conduction by tube 53 energizes control relay 54. When energized, relay 54 closes its contact 55 which connects a conductor 91 to positive bus +. The potential of positive bus + provides a tripping impulse suitable for energizing the trip coil 15 of circuit interrupter 14. The tripping impulse is conveyed by conductor 91 to the normally open, parallel connected contacts 56, 57, 58 and 59 of the phase and ground tripping relays 25, 26, 27 and 29 respectively. As long as these contacts are open, the tripping impulse is blocked, but when a supervising relay contact closes, the tripping impulse is supplied to the trip coil 15. As can be seen in Fig. 2, when any one of the supervising relays operates to close its contact, and when control relay 54 is energized by operation of the comparing circuit, a closed circuit including trip coil 15 is formed between negative and positive buses. Thus, trip coil 15 is energized to trip circuit interrupter 14.

The portion of the derived voltage which appears across resistor 46 of the network 30 is supplied to an oscillating signal transmitter T. Whenever point 49 of resistors 46 is positive with respect to point 47, and the magnitude of this voltage exceeds a predetermined amount which corresponds to less than that predetermined minimum value of voltage required to operate level detecting relay 52, transmitter T is energized in a manner to generate an oscillating signal, i. e., a signal voltage of high frequency, such as 100,000 cycles per second. This signal voltage is applied to a winding 60 of a suitable transformer 61, and carrier-current is induced in a winding 62 of the transformer 61. Winding 62 is connected in series circuit relationship with a coupling capacitor 63 between conductor 11*c* and ground. Capacitor 63, which has sufficient insulation to withstand transmission line voltage, easily passes high frequency carrier-current, but presents a high impedance to the line current of power frequency. The carrier-current is transmitted by way of conductor 11*c* through a coupling capacitor and a transformer winding located at the opposite terminal to ground. A parallel resonant circuit comprising an inductance 64 and a capacitor 65 tuned to the carrier-current frequency is connected in series circuit relation with conductor 11*c* to provide a wave trap which confines the carrier-current to the protected transmission line extending between opposite terminals, without introducing any appreciable impedance to current of power frequency.

Carrier-current generated at the opposite terminal B travels via conductor 11*c* and through coupling capacitor 63 and transformer winding 62 to ground. Thus, a substantial oscillating signal is developed across a third winding 66 of the transformer 61. An oscillating signal receiver R, which is tuned to the frequency of the carrier-current originating at terminal B, is energized by the signal voltage induced in winding 66 by the carrier-current received from the opposite terminal. Receiver R produces a negative restraining voltage when energized by this oscillating signal, and the restraining voltage is supplied to the control grid 53*c* of comparer tube 53. Tube 53 is prevented from conducting whenever the negative restraining voltage is applied to its control grid 53*c*.

Although for the purposes of illustration, I have shown a relaying system using the well known carrier-current pilot for transmitting signals between terminals, it should be clear that other methods of intercommunication, such as wire pilot or microwave, lend themselves equally well to my system. The high frequency oscillation transmitter T and receiver R shown in block form in Fig. 2, may be of any suitable construction. For example, the transmitter and receiver circuits disclosed and fully described in U. S. Patent No. 2,087,127 issued to Sporn and Muller on July 13, 1937, are readily adaptable to perform the transmitting and receiving functions in the illustrated embodiment of my invention.

In my phase comparison relaying system, transmitter T is designed to be energized at a predetermined level of derived voltage which corresponds to less than the normal magnitude of transmission line load current. Therefore, I have provided means to avoid the undesirable condition of continuous transmission of oscillating signals between terminals. As shown in Fig. 2, this means comprises phase starting relays 22, 23 and 24 and ground starting relay 28. Normally closed contacts 67, 68, 69 and 70 of these relays, respectively, are connected in series circuit relation between points 48 and 49 of the network 30. Until at least one of these relays operates, a short circuit is maintained across resistors 45 and 46 and the derived voltage is effectively suppressed. Thus, no voltage can be supplied either to transmitter T or to comparer 50 until a starting relay operates thereby liberating the derived voltage.

The phase fault responsive relays will now be considered. Both the starting relays 22, 23 and 24 and the supervising relays 25, 26 and 27 are conventional distance type relays. In the embodiment of my invention illustrated in Fig. 2, "offset mho" distance relays preferably are used. These relays are supplied by the currents in the secondary circuits of current transformers 19, 20 and 21 and by voltages derived from the electric power circuit by a pair of potential transformers 71 and 72. The relays respond to the ratio of transmission line voltage to current which ratio, designated apparent impedance Z, defines impedance looking into the transmission line from the local terminal A. When a transmission line fault occurs, the apparent impedance Z becomes a measure of the distance from the local terminal to the fault. Each of the groups of three phase relays is used to detect phase-to-phase faults involving a different pair of transmission line conductors 11*a*, 11*b* and 11*c*, and for those 3-phase fault conditions within the operating regions of the relays, all three relays in the group will operate.

The operating characteristic of an offset mho relay is defined by the equation $Z=K\cos(\phi-\theta)-Z_0$, where K is a predetermined constant, $\phi$ is the phase angle between transmission line current and voltage, $\theta$ is a design constant of the relay which determines the angle of the operating characteristic, and $Z_0$ is a predetermined offset impedance. This operating characteristic can be obtained by using relay construction such as that which has been illustrated schematically by way of example in Fig. 3. As shown in Fig. 3, the relay comprises a magnetic frame member 73 having two pairs of oppositely disposed spaced apart poles 74*a* and 74*b* and 75*a* and 75*b*. An induction cylinder 76 is mounted for rotary movement on its axis which is disposed perpendicular to and intermediate the poles. Suitable windings are disposed on each pole, and the fluxes produced by currents flowing in these windings induce eddy currents in the induction cylinder 76. The eddy currents interact with the fluxes in a manner to create torques which tend to rotate cylinder 76. A switch arm 77 is carried on the axis of cylinder 76, and rotation by the cylinder causes arm 77 to make or break contact with fixed switch contacts 78.

To obtain the desired operating characteristic, a winding 79 on pole 74*a* is supplied with current from a current transformer secondary circuit. Operating flux is produced by winding 79, and the value of this flux is proportional to transmission line current I. The proportionality can be adjusted by changing the number of turns of windings 79 as indicated in Fig. 3. The same current transformer secondary circuit also supplies a primary winding 80 of a transactor 81 similar to the transactors 31 and 32 described above. Transactor 81 is provided with a secondary winding 82 which has an adjustable tap 82*a* and which is loaded by a resistor 83. The voltage across the tapped portion of secondary winding 82 is $IZ_0$, where $Z_0$ is a predetermined constant impedance whose magnitude and phase angle are determined by the setting of tap 82*a* and by the magnitude of resistor 83. $Z_0$ is called the offset impedance.

A winding 84 on pole 74*b* is supplied with potential transformer voltage vectorially added to the voltage $IZ_0$. Restraining flux is produced by winding 84, and the value of this flux is proportional to transmission line voltage V plus $IZ_0$. An adjustably tapped resistor 85 determines the proportion.

Windings 86 and 87 on poles 75*a* and 75*b* respectively are also supplied with potential transformer voltage plus $IZ_0$. A capacitor 88 is connected in series with windings 86 and 87 to provide memory action. Capacitor 88 maintains a voltage supply for these windings for a short time after a transmission line fault of zero volts, thereby enabling the relay to respond correctly to such a fault. Poles 75*a* and 75*b* produce polarizing flux which induces eddy currents in the inductance cylinder 76. The eddy currents react with the restraining flux to create a restraining torque equal to $$\frac{1}{K}(V+IZ_0)(V+IZ_0)$$

which tends to rotate cylinders 76 counterclockwise as shown in Fig. 3. The eddy currents also react with the operating flux to create an operating torque equal to $(V+IZ_0)I\cos(\phi-\theta)$, and this operating torque tends to rotate cylinder 76 clockwise. Whenever the restraining torque becomes less than the operating torque, the relay will operate. As illustrated in Figs. 2 and 3, relay operation always rotates the induction cylinder clockwise, and whether such operation results in circuit closing, as is the case for supervising relay contacts 56, 57 and 58, or in circuit opening, as is the case for starting relay contacts 67, 68 and 69, depends upon the location of the fixed contacts.

To illustrate the operating characteristic of the phase relays, reference should be made to the graphical representation in Fig. 6. Fig. 6 is a conventional impedance diagram in which the origin represents the physical location of the local terminal A of the protected transmission line, while the abscissa R and ordinate *j*X describe values of resistance and inductive reactance respectively as determined by the vectorial relationship between transmission line voltage V and current I measured at terminal A. Both coordinates R and *j*X are scaled equally and in the same units, such as ohms, on a phase-to-neutral basis. A transmission line has a determinable impedance which is represented, for example, by a portion of a line TL. The opposite terminal B has been indicated in Fig. 6, and the protected section of the transmission line extends between terminals A and B. The terminal A' located on the opposite side of capacitor 13 from terminal A, as shown in Fig. 1, is also indicated in Fig. 6. Terminal A' is offset from the terminal A by an amount equal to the *j*X value of capacitor 13. The operating characteristics of the phase relays are arranged to be approximately symmetrical about line TL.

The circular solid line curves 95 and 96 shown in Fig. 6 represent respectively the loci of impedance values which define the operating limits of a phase starting and a phase supervising relay located at terminal A as shown in Fig. 2. Similarly, the broken line curves 97 and 98 represent respectively the loci of impedance values which define the operating limits of the phase starting and phase supervising relays located at terminal B of the transmission line. Each locus has been drawn by plotting the operating characteristic equation $Z=K\cos(\phi-\theta)-Z_0$ which corresponds to an equality between restraining and operating torques in the relay. Whenever the apparent impedance Z of the transmission line, as indicated by the ratio of voltage and current quantities supplied to the relays by the potential and current transformers at terminal A, falls within the area circumscribed by the locus of a relay, the restraining torque has become less than operating torque and that relay will operate. It is well known to those skilled in the art that under normal load conditions the apparent impedance of the transmission line will fall outside of the operating range of the relays, while upon the occurrence of any phase fault on the protective line or nearby, the apparent impedance will instantly change to a value which will cause relay operation.

The desired diameter of the circular impedance operating characteristic and the amount of offset $Z_0$ are established by appropriate settings of the adjustable elements shown in Fig. 3. It will be observed from Fig. 6 that the operating characteristics of the phase supervising relays at both terminals encompass the protected transmission line, and that the operating characteristic of the phase starting relay at each terminal encompasses the operating characteristic of the supervising relay located at the opposite terminal. Any fault within the operating characteristic of a supervising relay at one terminal will therefore cause starting relay operation at the opposite terminal. Since the starting relays have normally closed contacts and the supervising relays have normally open contacts, the starting relay will always operate first. In other words, the suppressed voltage derived by network 30 at one terminal will be liberated before a tripping impulse can be supplied to the circuit interrupter located at the other terminal.

The ground starting and supervising relays 28 and 29 respectively shown in Fig. 2 are of the electromagnetic type and operate in response to overcurrent conditions in the residual circuit of the current transformers 19, 20 and 21. Such overcurrent conditions occur during ground faults. The starting relay 28 is arranged to be more sensitive than the supervising relay 29, i. e., the starting relay will operate at a lower level of residual current than is required to operate the supervising relay.

From the foregoing detailed description of the circuits of one embodiment of my phase comparison protective relaying system, its mode of operation may now be readily followed. During an external transmission line phase fault beyond the operating range of the starting relays at both terminals A and B, no relay operation occurs. During an external phase fault within the operating range of the starting relays but beyond the operating range of the supervising relays, the tripping impulse necessary to open the circuit interrupter located at each terminal is blocked by the open circuit of the unoperated supervising relays.

Assume now that a phase-to-phase transmission line fault condition occurs at the point F1 indicated in Figs. 1 and 6. The appropriate phase starting and phase supervising relays at the terminals A and B will detect this external fault and will operate substantially regardless of the magnitude of fault current. At each terminal, the previously suppressed derived voltage of network 30 is immediately liberated, a portion of this voltage is supplied to transmitter T, and an oscillating signal is transmitted during the alternate half cycles of derived voltage which have proper polarity. The networks at terminals A and B are arranged so that the derived voltages during an external fault condition are out-of-phase with respect to each other. For example, under the assumed fault condition at F1, fault current would flow into the transmission line at terminal A and out at terminal B, and the polarity of point 49 of the network 30 at terminal A will be positive with respect to point 47 at the same time the polarity of the corresponding point at terminal B is negative. In other words, as long as current is flowing simultaneously in the same instantaneous direction along the transmission line at both terminals, as when the protected transmission line is in a sound condition, the derived voltage at one terminal will be 180 degrees out-of-phase with respect to the derived voltage at the other terminal. Therefore, for the external fault condition at F1, the transmitters will be alternately energized, and as a result oscillating signals will be alternately transmitted from terminals A and B.

When the appropriate phase starting relays have operated in response to the fault at F1, a portion of the voltage derived by the network 30 at each terminal is available to provide operating voltage for the associated comparing circuit 50. However, before the comparing circuit can be energized, level detecting relay 52 must operate to close its contact 51. Relay 52 will not operate unless the level of derived voltage is more than sufficient to energize transmitter T. Thus, when relay 52 operates, it is known that oscillating signals are being transmitted, and operating voltage can safely be supplied to the comparing circuit without risking possible false operation due to the comparer being energized by derived voltage having too little magnitude to energize the transmitter T during external faults.

Alternate half cycles of derived voltage provide operating voltage for comparer 50. These half cycles have a polarity opposite to those half cycles which energize the associated transmitter T. At the same time operating voltage is being supplied to comparer 50 during the fault at F1, the comparer is also receiving a negative restraining voltage from receiver R, since R is then responding to the oscillating signal transmitted from the opposite terminal. Thus, the comparer at each terminal can produce no tripping impulse during the external fault condition. Because the local phase starting relay may operate slightly before phase starting relay operation at the opposite terminal, it is possible for the local operating voltage to energize the comparer before a restraining voltage is produced in response to the initial oscillating signal received from the opposite terminal. However, the tripping impulse that would be produced as a result of this sequence is blocked by the local supervising relay whose contact remains open until some instant of time after the starting relays at both terminals have had opportunity to operate.

Next assume an internal phase-to-phase transmission line fault condition at F2 as shown in Figs. 1 and 6. The operation of my phase comparison relaying system will be practically the same as described above for the fault condition at F1. However, fault current is now flowing into the transmission line at both terminals A and B, and as a result the phase relation of the derived voltage at terminal B has reversed 180 electrical degrees with respect to its former phase relation. Thus, the derived voltages at the two terminals are now in phase with each other, and oscillating signals are transmitted simultaneously every other half cycle. Under this condition, the comparer 50 at each terminal is supplied alternately with operating and restraining voltages. While the comparer is energized by operating voltage, there is no restraining voltage to prevent operation, and therefore tripping impulses are produced during alternate half cycles of derived voltage. When the appropriate phase supervising relays have operated in response to the fault at F2, the tripping impulses at both terminals A and B are supplied to the corresponding circuit interrupters which are substantially simultaneously tripped thereby, thus disconnecting the protected transmission line section 11 from the electric power transmission system.

For an external phase-to-phase fault at F3 as shown in Figs. 1 and 6, the relaying system will respond in the manner described above for a fault at F1. The direction of fault current at any given instant will be the same at both terminals A and B, and no comparer output is obtained. For the fault at F3, my invention is particularly advantageous since correct blocking results although the series capacitor 13 causes the fault to appear to the starting and supervising relays as though it were in the general area of the protected transmission line, as is graphically demonstrated by Fig. 6.

If an internal fault should involve transmission line conductor 11*c*, so that no oscillating signals can be transmitted between terminals, correct relay operation is nevertheless obtained. This is because the signal which is transmitted from one terminal to the opposite terminal produces a restraining voltage, and during internal faults this restraining influence is uneffective and is in fact unnecessary.

The operation of one embodiment of my phase comparison relaying system has been described above for phase-to-phase fault conditions. The relay system operation will be substantially the same for phase-to-ground fault conditions except that ground starting and supervising relays 28 and 29 will be effective instead of the phase starting and supervising relays.

In accordance with another embodiment of my invention, when an electric power transmission circuit has no series connected capacitor, as illustrated by Fig. 4, the relaying arrangement of Fig. 2 may be modified as indicated in Fig. 5. As shown in Fig. 5, phase starting relays 100, 101 and 102 and phase supervising relays 103, 104 and 105 are provided. The normally open contacts of the phase supervising relays are connected in parallel circuit relationship, and this parallel circuit is connected in series with the operating coil of an electromagnetic auxiliary relay 106 between positive and negative supply voltage buses + and —. When energized as a result of operation by one of the phase supervising relays, auxiliary relay 106 closes a normally open contact 107 and opens a normally closed contact 108. Closure of contact 107 unblocks the tripping circuit which supplies tripping impulses from the comparing circuit to the local circuit interrupter. Contact 108 is connected in series circuit relationship with the normally closed contacts of the starting relays. Upon opening, contact 108 liberates the derived voltage and permits the associated transmitter and comparer to be energized.

In the Fig. 5 embodiment of my invention, the phase relays 100—105 are of the distance type. Fig. 7, which is an impedance diagram similar to Fig. 6 explained above, illustrates the operating characteristics of these relays. The starting relays, 100, 101 and 102 are again offset mho relays, and the circular solid line curve 109 represents the locus of impedance values which define the operating limits of a phase starting relay located at terminal C of the protected transmission lines. The broken line circle 110 shows the operating characteristic of a phase starting relay at the opposite terminal D. In this embodiment of my invention, the phase supervising relays are mho relays without offset, and the circular solid line curve 111 represents the locus of impedance values which defined the operating limits of a phase supervising relay at local terminal C. Similarly, the broken line circle 112 is the operating characteristic of a phase supervising relay at terminal D.

As shown by Fig. 7, the phase supervising relays at each terminal are arranged to respond to phase-to-phase faults on the protected transmission line and beyond the opposite terminal by a predetermined margin. Any external fault to which a phase supervising relay at one terminal responds will cause operation of a phase starting relay at the other terminal. In other words, a fault within the aforesaid predetermined margin will cause phase starting relay operation at the opposite terminal. Assume such a fault in response to which a phase supervising relay at terminal C operates to liberate the voltage derived by the local network. Since the phase starting relays operate in advance of supervising relay operation, an oscillating signal will be transmitted from the opposite terminal D thereby producing a restraining voltage at the local terminal C before operating voltage is supplied to the local comparing circuit. Thus, for this external fault condition, no tripping impulse is produced by the comparer, and the Fig. 5 embodiment of my invention operates in the same manner as the Fig. 2 embodiment operated in response to the external phase-to-phase fault at point F1.

Consider now an internal phase-to-phase fault on the protected transmission line at a point which is outside the operating range of the phase starting relays located at one terminal, e. g., terminal D. If such a fault were located at F4 as shown in Figs. 4 and 7, the appropriate phase starting relay at terminal C would operate, the derived voltage at the local terminal would be liberated, and operating voltage would be supplied to the local comparer. As a result, a tripping impulse would be produced by the comparer at terminal C, and as soon as the appropriate phase supervising relay operates, this tripping impulse is supplied to the local circuit interrupter which is tripped thereby. If the fault occurs at F5, there would be no phase starting relay operation at either terminal, but the local comparer would be supplied with operating voltage as soon as the appropriate phase supervising relay at terminal C operates to energize auxiliary relay 106 and open contact 108. During either fault condition, at F4 or F5, no oscillating signal is transmitted from the opposite terminal D until the appropriate phase supervising relay at D operates to liberate the derived voltage which energizes the transmitter at that terminal. However, it is immaterial to the equipment at terminal C whether an oscillating signal with its concomitant restraining voltage is received from terminal D before or after the phase supervising relay at C has operated, since the restraining voltage when it does appear will not prevent the local comparer from producing tripping impulses during these internal fault conditions. As pointed out hereinbefore, during an internal fault the derived voltages at both terminals are in phase with each other, and operating and restraining voltages are produced alternately at each terminal.

While I have shown and described a preferred form of my invention by way of illustration, many modifications will occur to those skilled in the art. I therefore contemplate by the appended claims to cover all such modifications as fall within the true spirit and scope of my invention.

What I claim as new and desire to secure by Letters Patent of the United States is:

1. A phase comparison relaying system for protecting an alternating current polyphase electric power transmission circuit having spaced apart terminals and having an electroresponsively tripped circuit interrupter at one of said terminals comprising, a transmitter located at another terminal of the protected circuit and operable when energized to transmit an oscillating signal of predetermined frequency, means including a first fault responsive starting relay for energizing said transmitter only when the circuit current at said other terminal is flowing in a predetermined instantaneous direction during predetermined fault conditions, a receiver located at said one terminal and tuned to said predetermined frequency for producing a restraining voltage in response to energization by said oscillating signal, a network for deriving an operating voltage whenever the circuit current at said one terminal is flowing in said predetermined instantaneous direction, a second fault responsive starting relay for suppressing said operating voltage, said second starting relay being operable to liberate said operating voltage in response to a fault in the protected circuit, comparing means coupled to said receiver and network for producing a tripping impulse when energized by said operating voltage in the absence of energization by said restraining voltage, and a fault responsive supervising relay operable in response to one of said predetermined fault conditions to supply said tripping impulse to said circuit interrupter, said supervising relay being arranged to operate after said first starting relay operates.

2. A phase comparison relaying system for protecting a polyphase electric power transmission line having a pair of spaced apart terminals between which alternating current flows and having an electroresponsively tripped circuit interrupter at one of said terminals comprising, a distance relay located at said one terminal and operable in response to a fault condition on said protected line, a transmitter located at the other terminal of the protected line and operable when energized to transmit an oscillating signal of predetermined frequency, means including a first fault responsive relay for energizing said transmitter throughout only those periods during which line current at said other terminal is flowing in a predetermined instantaneous direction whenever said first relay operates, said first relay being arranged to operate in advance of said distance relay operation in response to any fault condition which causes said distance relay to operate, a receiver located at said one terminal and tuned to said predetermined frequency for producing a restraining voltage in response to energization by said oscillating signal, means including a second fault responsive relay for deriving an operating voltage throughout only those periods during which line current at said one terminal is flowing in said predetermined instantaneous direction whenever a fault condition occurs on said protected line, and comparing means operable in response to energization by said operating voltage in the absence of energization by said restraining voltage, said circuit interrupter being tripped only in response to the operation of both said distance relay and said comparing means.

3. A fault responsive relaying system for protecting a section of a polyphase alternating current electric circuit, the protected section having an electroresponsively tripped circuit interrupter at one terminal thereof, comprising a first distance relay located at said one terminal and operable in response to fault conditions on said protected section, a transmitter located at another terminal of the protected section for transmitting an oscillating signal of a predetermined frequency, means including a second distance relay for energizing said transmitter only during alternate half cycles of circuit current at said other terminal, said second relay having an operating characteristic which encompasses the operating characteristic of said first relay, a receiver located at said one terminal and tuned to said predetermined frequency for producing a restraining voltage in response to energization by said oscillating signal, means including a third distance relay for deriving an operating voltage only during alternate half cycles of circuit current at said one terminal, said third relay being operable in response to fault conditions on said protected section, and comparing means operable in response to energization by said operating voltage in the absence of said restraining voltage, said circuit interrupter being tripped in response to the operation of both said first relay and said comparing means.

4. A phase comparison relaying system for protecting a section of an alternating current polyphase electric power transmission line, said section having electroresponsively tripped circuit interrupters at spaced apart terminals thereof, comprising, a supervising relay located at each terminal and operable in response to transmission line fault conditions between predetermined points including at least said protected section, a starting relay located at each terminal and operable in response to any fault condition to which the supervising relay at the opposite terminal will operably respond, said starting and opposite supervising relays being arranged so that operation by the former precedes operation by the latter, a network coupled to the transmission line at each terminal for deriving a single phase alternating quantity having a predetermined phase relationship to the line current at the associated terminal, means for suppressing said derived quantity until the associated starting relay operates, a transmitter located at each of said terminals and supplied by said derived quantity for transmitting an oscillating signal of predetermined frequency only during alternate half cycles of said derived quantity, a receiver located at each terminal and tuned so as to produce a control voltage in response to an oscillating signal received from the transmitter located at the opposite terminal, comparing means at each terminal connected to the associated network and receiver for producing a tripping impulse only when energized by a predetermined combination of said control voltage and of alternate half cycles of said derived quantity, and means including the associated supervising relay for supplying said tripping impulse to the circuit interrupter whenever said supervising relay operates.

5. A phase comparison relaying system for protecting a polyphase electric power transmission circuit having spaced apart terminals between which alternating current is conducted and having an electroresponsively tripped circuit interrupter at one of said terminals comprising, a first fault responsive relay located at said one terminal and operable in response to fault conditions located in said protected circuit and beyond the other terminal by a predetermined margin, a transmitter located at said other terminal and operable when energized to transmit an oscillating signal of predetermined frequency, means including a second fault responsive relay to energize said transmitter only as long as the circuit current at said other terminal is flowing in a predetermined instantaneous direction whenever said second relay operates, said second relay being arranged to operate in advance of said first relay operation for those fault conditions located in said predetermined margin beyond said other terminal with respect to said one terminal, a receiver located at said one terminal and tuned to said predetermined frequency for producing a restraining voltage in response to energization by said oscillating signal, means including said first fault responsive relay for deriving an operating voltage only as long as the circuit current at said one terminal is flowing in said predetermined instantaneous direction whenever said first relay operates, and comparing means operable in response to energization by said operating voltage in the absence of said restraining voltage, said circuit interrupter being tripped only in response to the operation of both said first relay and said comparing means.

6. A phase comparison relaying system for protecting a section of an alternating current polyphase electric power transmission line, said protected section having electroresponsively tripped circuit interrupters at spaced apart terminals thereof, comprising a supervising relay located at each terminal and operable only in response to internal transmission line fault conditions on the protected section and external transmission line fault conditions beyond the opposite terminal by a predetermined margin, a starting relay located at each terminal and operable in response to any external fault condition to which the supervising relay at the opposite terminal will operably respond, said starting and opposite supervising relays being arranged so that operation by the former precedes operation by the latter, a network coupled to the transmission line at each terminal for deriving a single phase alternating quantity having a predetermined phase relationship with respect to the line current at the associated terminal, means for suppressing said derived quantity until one of the associated starting or supervising relays operates, a transmitter located at each of said terminals and supplied by said derived quantity for transmitting an oscillating signal of predetermined frequency during alternate half cycles of said derived quantity, a receiver located at each terminal and tuned so as to produce a control voltage in response to an oscillating signal received from the transmitter located at the opposite terminal, comparing means at each terminal connected to the associated network and receiver for producing a tripping impulse when energized by a predetermined combination of said control voltage and of alternate half cycles of said derived quantity, and means including the associated supervising relay for supplying said tripping impulse to the circuit interrupter whenever said supervising relay operates.

References Cited in the file of this patent

UNITED STATES PATENTS 2,419,904 McConnell ------------- Apr. 29, 1947